US012609724B2

(12) United States Patent
Chang

(10) Patent No.: US 12,609,724 B2
(45) Date of Patent: Apr. 21, 2026

(54) ELECTRONIC DEVICE AND MESSAGE TRANSMISSION METHOD FOR V2X SYSTEM

(71) Applicant: HON HAI PRECISION INDUSTRY CO., LTD., New Taipei City (TW)

(72) Inventor: Ke-Ping Chang, New Taipei City (TW)

(73) Assignee: HON HAI PRECISION INDUSTRY CO., LTD., New Taipei City (TW)

( * ) Notice: Subject to any disclaimer, the term of this patent is extended or adjusted under 35 U.S.C. 154(b) by 688 days.

(21) Appl. No.: 18/156,416

(22) Filed: Jan. 19, 2023

(65) Prior Publication Data

US 2024/0195446 A1 Jun. 13, 2024

(30) Foreign Application Priority Data

Dec. 7, 2022 (TW) .................................. 111147048

(51) Int. Cl.
*H04W 4/40* (2018.01)
*H04B 1/3822* (2015.01)

(52) U.S. Cl.
CPC ............ *H04B 1/3822* (2013.01); *H04W 4/40* (2018.02)

(58) Field of Classification Search
CPC ............................... H04B 1/3822; H04W 4/40
USPC ......................................................... 455/73
See application file for complete search history.

(56) References Cited

U.S. PATENT DOCUMENTS

| | | | | |
|---|---|---|---|---|
| 7,024,160 B2 * | 4/2006 | Huang | ................ | H04B 1/1009 |
| | | | | 455/226.1 |
| 7,299,127 B2 * | 11/2007 | Willer | .................... | G01S 19/35 |
| | | | | 701/487 |
| 2009/0046021 A1 * | 2/2009 | Huang | ................... | H01Q 1/243 |
| | | | | 343/702 |
| 2015/0123853 A1 * | 5/2015 | Wu | ........................ | H01Q 5/371 |
| | | | | 343/700 MS |

(Continued)

FOREIGN PATENT DOCUMENTS

| | | |
|---|---|---|
| CN | 111278006 A | 6/2020 |
| CN | 108349496 B | 10/2021 |

(Continued)

OTHER PUBLICATIONS

Takayuki Shimizu et al.,"Comparative Analysis of DSRC and LTE-V2X PC5 Mode 4 with SAE Congestion control", 2020 IEEE Vehicular Networking Conference (VNC), Dec. 16, 2020, pp. 1-8.

(Continued)

*Primary Examiner* — April G Gonzales
(74) *Attorney, Agent, or Firm* — CKC & Partners Co., LLC

(57) ABSTRACT

An electronic device, applicable to a V2X system is disclosed. The electronic device includes a wireless transceiver and a processor. The wireless transceiver is configured to receive a first collective perception message from another device of the V2X system. The processor is coupled to the wireless transceiver, and the processor is configured to operate the following operations: determining whether to generate a second collective perception message according to the first collective perception message according to a first angle of the electronic device and a second angle of another device of the first collective perception message; and sending the second collective perception message to several (Continued)

100 surrounding devices surrounding the electronic device through the wireless transceiver.

3 Claims, 6 Drawing Sheets

(56) References Cited

U.S. PATENT DOCUMENTS

| | | | |
|---|---|---|---|
| 2016/0043750 A1* | 2/2016 | Borlenghi | H04B 1/0057 |
| | | | 370/297 |
| 2017/0018182 A1* | 1/2017 | Makled | G08G 1/087 |
| 2017/0244821 A1* | 8/2017 | Ishida | H04B 1/385 |
| 2018/0365909 A1* | 12/2018 | Cheng | H04Q 9/00 |
| 2019/0045456 A1* | 2/2019 | Seo | H04W 52/243 |
| 2019/0088041 A1* | 3/2019 | Lee | G07C 5/085 |
| 2019/0221110 A1* | 7/2019 | Vanderveen | G06V 20/58 |
| 2019/0339082 A1* | 11/2019 | Doig | G01C 21/3848 |
| 2019/0394786 A1* | 12/2019 | Parron | H04W 4/46 |
| 2020/0169838 A1* | 5/2020 | Futaki | H04W 4/06 |
| 2020/0228946 A1* | 7/2020 | Hwang | H04L 69/26 |
| 2020/0284883 A1* | 9/2020 | Ferreira | G01S 7/4815 |
| 2020/0372795 A1* | 11/2020 | Szilagyi | H04W 4/44 |
| 2021/0020035 A1* | 1/2021 | Tijink | G08G 1/0116 |
| 2021/0067926 A1* | 3/2021 | Hwang | H04W 4/023 |
| 2021/0110707 A1* | 4/2021 | Vanderveen | H01Q 1/22 |
| 2021/0160323 A1* | 5/2021 | Nassor | G08G 1/093 |
| 2021/0204306 A1* | 7/2021 | Li | H04B 7/155 |
| 2021/0383167 A1* | 12/2021 | Chakravarty | G06T 7/70 |
| 2022/0005353 A1* | 1/2022 | Hwang | H04W 4/40 |
| 2022/0103986 A1* | 3/2022 | Hwang | H04W 4/44 |
| 2022/0217513 A1* | 7/2022 | Back | H04W 4/021 |
| 2022/0217568 A1* | 7/2022 | Mach | H04W 28/0284 |
| 2022/0398919 A1* | 12/2022 | Vanderveen | G01S 13/74 |
| 2023/0104083 A1* | 4/2023 | Morvan | H04W 4/44 |

FOREIGN PATENT DOCUMENTS

| | | |
|---|---|---|
| TW | I625688 B | 6/2018 |
| WO | 2017/045139 A1 | 3/2017 |

OTHER PUBLICATIONS

Tran Van Lon et al., "On the application of Social Internet of Things with Fog Computing: A new Paradigm for Traffic Information Sharing System", 2018 IEEE 6th International Conference on Future Internet of Things and Cloud (FiCloud), IEEE, Aug. 6, 2018, pp. 349-354.

* cited by examiner

300

S310 receiving a first collective perception message from another device of the V2X system by a wireless transceiver of a device of the V2X system

S330 determining whether to perform a relay transfer of the first collective perception message by a processor of the device of the V2X system

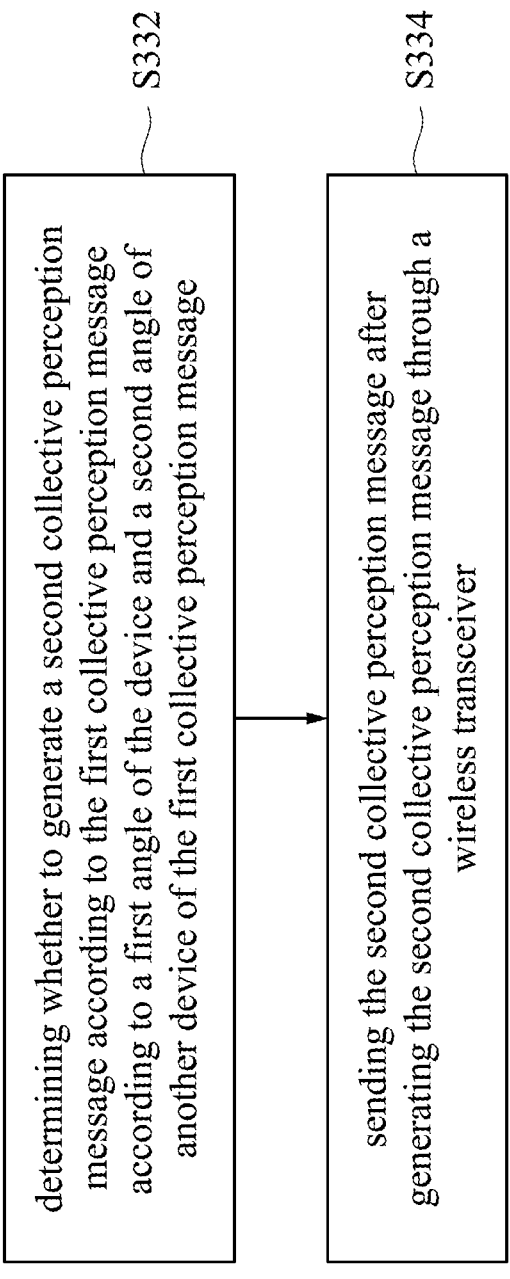

S330

S332 determining whether to generate a second collective perception message according to the first collective perception message according to a first angle of the device and a second angle of another device of the first collective perception message

S334 sending the second collective perception message after generating the second collective perception message through a wireless transceiver

ELECTRONIC DEVICE AND MESSAGE TRANSMISSION METHOD FOR V2X SYSTEM

RELATED APPLICATIONS

This application claims priority to Taiwan Application Serial Number 111147048, filed Dec. 7, 2022, which is herein incorporated by reference in its entirety.

BACKGROUND

Field of Invention

The present application relates to an electronic device and a message transmission method suitable for a V2X system. More particularly, the present application relates to an electronic device and a message transmission method suitable for relay transferring the collective perception message in the V2X system.

Description of Related Art

One of the main challenges of highly automated driving is the vehicle's comprehensive cognition of the surrounding environment. It is necessary to have sufficient understanding of the surrounding environment, and a vehicle with a certain degree of automated driving can perform safe and comfortable automated operations. The current sensor system is limited to line-of-sight detections and cannot meet the strict functional requirements of autonomous driving applications. V2X (Vehicle-to-everything) communication has become a potential technology to solve this problem. Through allowing vehicles to share various information, the vehicle's environmental awareness is improved, and the vehicle's decision-making basis is strengthened.

As an example of V2X applications, collective perception allows sites (vehicles and infrastructure) to notify connected sites of perceived objects (such as pedestrians, obstacles, and other vehicles) detected by their object tracking sensors. This enables the receiving vehicle to extend its environment model beyond the range of its own sensors. Object data is exchanged through the collective perception message (CPM), and CPM is currently being standardized by the European Telecommunications Standards Institute (ETSI) to ensure its interoperability between all vehicles that conform to the communication standard.

Even though CPM greatly allows intelligent cognition of the environment, the communication on urban street corners is still quite challenging because of the blockage of buildings. What is more, due to the infrastructure shortages of wireless network, the possibility of transmitting the emergency information in the remote area is hindered. Therefore, if the received cognitive objects in the CPM are broadcast again through the V2X sidelink (side chain), the cognitive range and the number of cognitive objects can be expanded.

When information is expected to be widely transmitted and quickly transmitted to a remote device, after the transmission of the first layer, it is necessary to perform the relay transmission (relay) of the second layer or even the third layer or more layers again. However, this relay transmission method will cause an infinite flood of information. How to quickly transmit the information to a remote device while preventing the infinite flood of information is a problem to be solved in this field.

SUMMARY

The disclosure provides an electronic device, applicable to a V2X system is disclosed. The electronic device includes a wireless transceiver and a processor. The wireless transceiver is configured to receive a first collective perception message from another device of the V2X system. The processor is coupled to the wireless transceiver, and the processor is configured to operate the following operations: determining whether to generate a second collective perception message according to the first collective perception message according to a first angle of the electronic device and a second angle of another device of the first collective perception message; and sending the second collective perception message to several surrounding devices surrounding the electronic device through the wireless transceiver.

The disclosure provides a message transmission method is disclosed. The message transmission method is suitable for a device of a V2X system. The message transmission method includes the following operations: receiving a first collective perception message from another device of the V2X system by a wireless transceiver of the device; and determining whether to perform a relay transfer of the first collective perception message by a processor of the device, including: determining whether to generate a second collective perception message according to the first collective perception message according to a first angle of the device and a second angle of another device of the first collective perception message; and after generating the second collective perception message, sending the second collective perception message to several surrounding devices surrounding the device by a wireless transceiver of the device.

The disclosure provides an electronic device, suitable for a V2X system is disclosed. The electronic device includes a wireless transceiver and a processor. The wireless transceiver is configured to receive a collective perception message from another device of the V2X system. The processor is coupled to the wireless transceiver, and the processor is configured to perform the following operations: calculating an absolute difference angle according to a first angle of the electronic device and a second angle of another device in the collective perception message; and not relay transferring the collective perception message to a plurality of surrounding devices surrounding the device when the absolute difference angle is greater than or equal to a threshold value.

It is to be understood that both the foregoing general description and the following detailed description are by examples and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows:

FIG. 4 is a flow chart illustrating an operation of the message transmission method in FIG. 3 according to some embodiments of the present disclosure.

DETAILED DESCRIPTION

Figure 1:
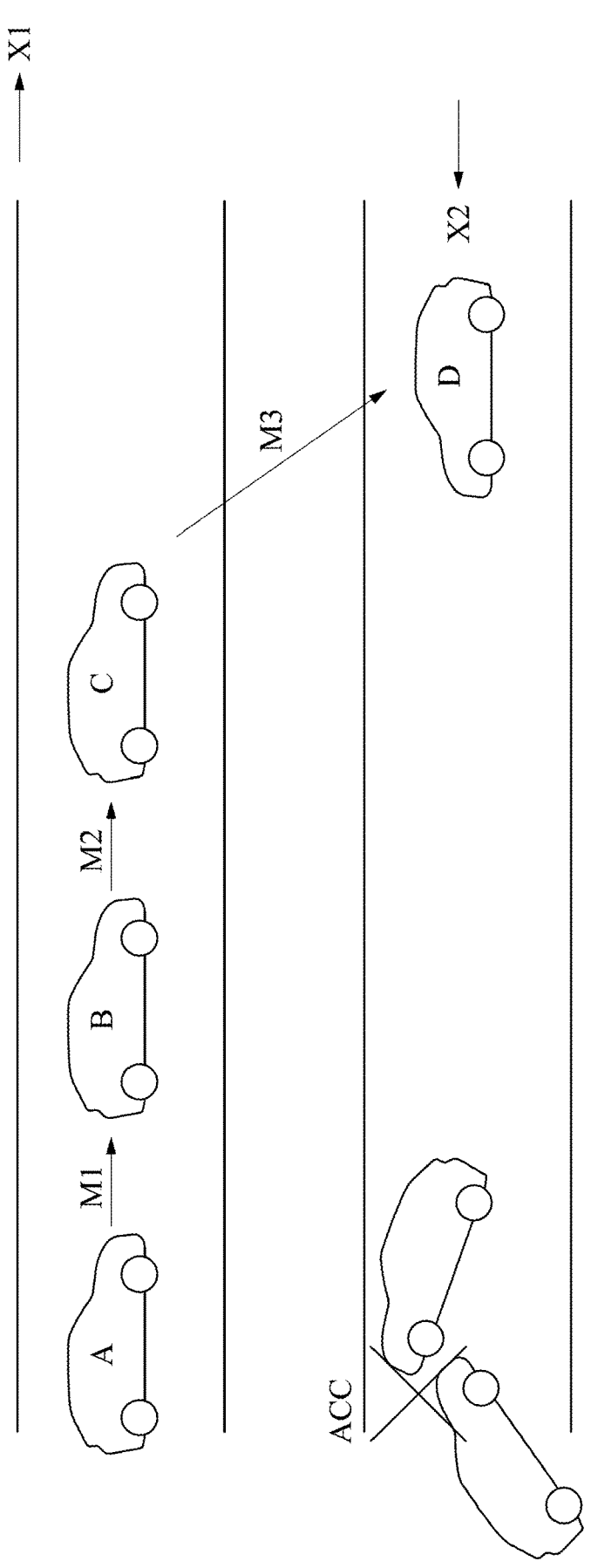
FIG. 1 is a schematic diagram illustrating a V2X system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

The term "coupled" used herein may also refer to "electrically coupled", and the term "connected" may also refer to "electrically connected". "Coupled" and "connected" may also refer to two or more components that cooperate or interact with each other.

Reference is made to FIG. 1. FIG. 1 is a schematic diagram illustrating a V2X system 100 according to some embodiments of the present disclosure. As illustrated in FIG. 1, the V2X system 100 includes vehicles (devices/V2X device) A, B, C, and D. Vehicles can send or receive information to each other through network communication. The detailed operation method of the V2X system 100 will be explained in reference to other diagrams below. Furthermore, the number of vehicles in the V2X system 100 in FIG. 1 is for illustrative purposes only, and the embodiments of the present disclosure are not limited thereto. In some embodiments, one of the vehicles A, B, C, D can also be represented by a cellphone or any other device in the V2X wireless communication system.

In some embodiments, V2X system 100 includes several V2X devices. The V2X device can be a vehicle, a cellphone or a road side unit (RSU).

In the scenario illustrated in FIG. 1, vehicles A, B, and C are all moving in the same direction along the road of direction X1, while vehicle D is moving along the road of direction X2. On the road of direction X2, a collision event ACC occurs in the distance of the forward direction of vehicle D. However, since the location where the event ACC occurs is far from the vehicle D, the vehicle D does not yet know that there is an event ACC ahead. On the other hand, the vehicle A moving in the opposite directions from the vehicle D passes the event ACC first. If it is possible to transmit the collective perception message (CPM) generated by the vehicle A according to the event ACC to the vehicle D as soon as possible while the vehicle A perceives the event ACC, the vehicle D can respond as soon as possible. In some embodiments, in order to transmit the collective perception message generated according to the event ACC from the vehicle A to the vehicle D as soon as possible, the following relay transfer method of the collective perception message can be adopted: after the vehicle A broadcasts the collective perception message, the vehicle B that received the collective perception message broadcasts the collective perception message to the surrounding devices, and then the vehicle C that receives the collective perception message broadcasts the collective perception message to the surrounding devices. By analogy, the collective perception message will be sent to the vehicle D in this relay transfer. However, this method will cause the problem of information flooding. In the embodiments of the present disclosure, a device and message transmission method suitable for the V2X system is proposed to prevent the infinite flood of information while quickly transmitting information to remote vehicles or devices.

Figure 2:
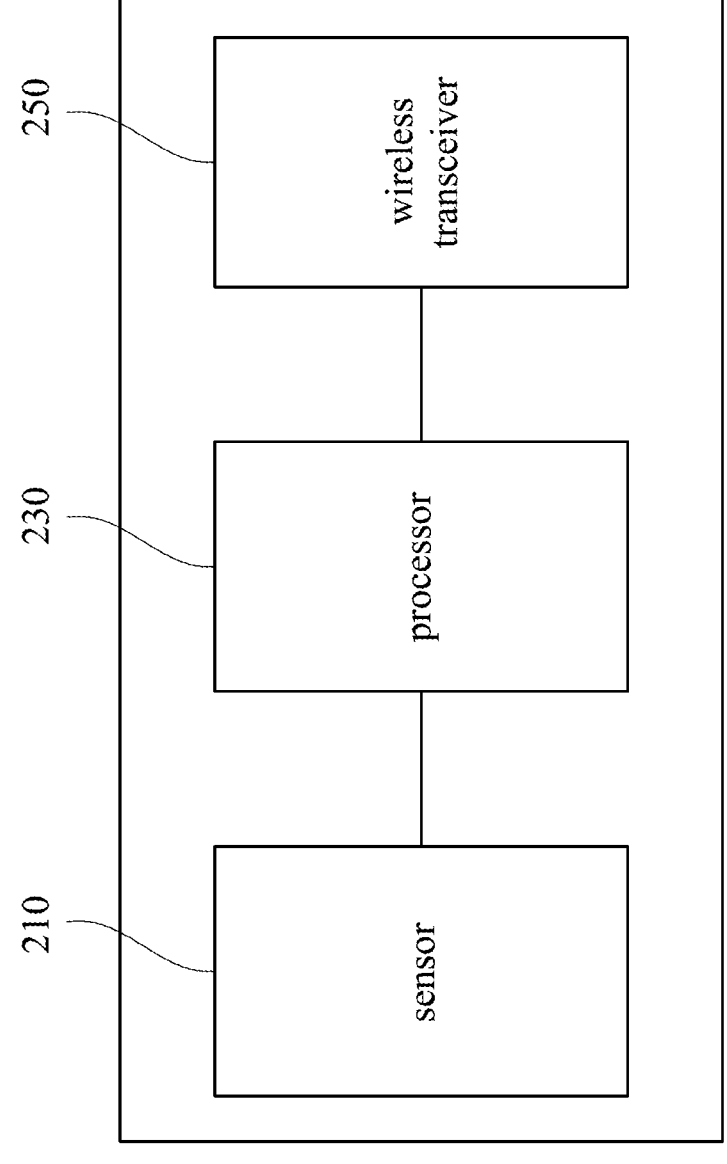
FIG. 2 is a schematic diagram illustrating a vehicle (device) according to some embodiments of the present disclosure.

Reference is made to FIG. 2. FIG. 2 is a schematic diagram illustrating a vehicle (electronic device) 200 according to some embodiments of the present disclosure. The vehicle 200 shown in FIG. 2 can be used to represent the vehicles A, B, C, D in FIG. 1 and the vehicles E, F in FIG. 6.

As illustrated in FIG. 2, the vehicle 200 includes the sensor 210, the processor 230 and the wireless transceiver 250. In the connection relationship, the sensor 210 is coupled to the processor 230, the processor 230 is further coupled to the wireless transceiver 250. The detailed operation method of the vehicle 200 will be explained in reference to other figures below. Furthermore, the vehicle 200 in FIG. 2 is for illustrative purposes only, and the embodiments of the present disclosure are not limited thereto.

Figure 3:
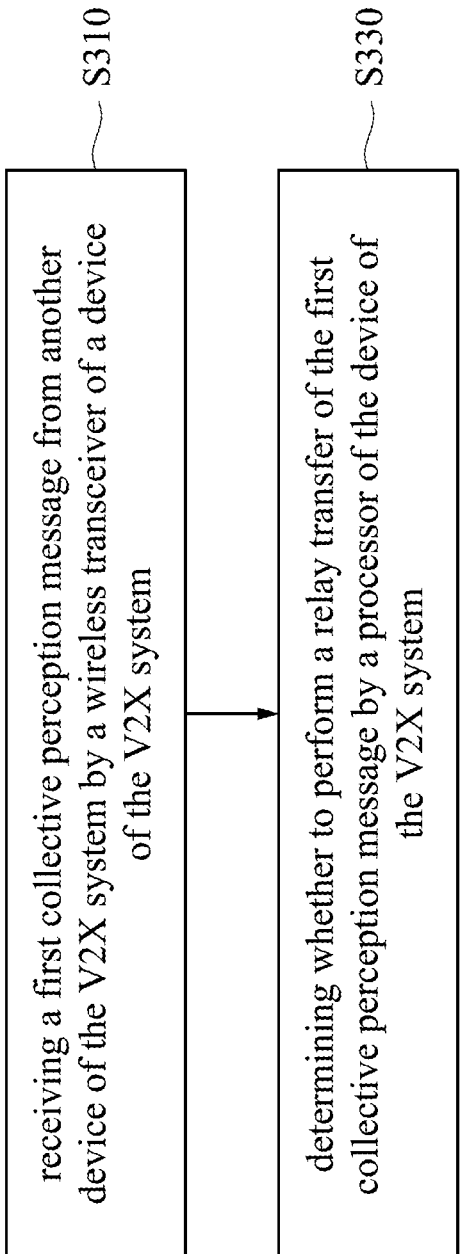
FIG. 3 is a flow chart illustrating a message transmission method according to some embodiments of the present disclosure.

Reference is made to FIG. 3 together. FIG. 3 is a flow chart illustrating a message transmission method 300 according to some embodiments of the present disclosure. The embodiments of the present disclosure are not limited thereto.

It should be noted that, the message transmission method 300 can be applied to a system with the same or similar structure as the V2X system 100 in FIG. 1 or a device with the same or similar structure as the vehicle 200 in FIG. 2. In order to make the description simple, the following will take FIG. 1 and FIG. 2 as references to describe the operation method, but the embodiments of the present disclosure are not limited to the above-mentioned applications.

It should be noted that, in some embodiments, the message transmission method 300 can also be implemented as a computer program and stored in a non-transitory computer-readable recording medium, so that the computer, the electronic device, or the above-mentioned processor 230 in FIG. 2 reads the recording medium to implement the operation method. The processor 230 can be composed of one or more chips. The non-transitory computer-readable recording medium can be a read only memory, a flash memory, a floppy disk, a hard disk, an optical disk, a pen drive, a magnetic tape, a database accessible from a network or a non-transitory computer-readable recording medium with the same function can be easily conceived by those familiar with the art.

In addition, it should be understood, the operation of the message transmission method 300 mentioned in the present disclosure, except for those whose order is specifically stated, can be adjusted according to actual needs, and even simultaneously or partially simultaneously implement. Furthermore, in different embodiments, these operations can also be adaptively added, replaced, and/or omitted.

Reference is made to FIG. 3. The message transmission method 300 includes operations S310 and S330.

In operation S310, a first collective perception message is received from another device of the V2X system by a wireless transceiver of a device of the V2X system. Reference is made to FIG. 2 together, in some embodiments, operation S310 can be performed by the wireless transceiver 250 as illustrated in FIG. 2.

Reference is made to FIG. 1 and FIG. 2 together. For example, after the sensor 210 of the vehicle A in FIG. 1 senses the event ACC of a car accident, the sensor 210 of the vehicle A transmits the event ACC and related information (such as the location of the event ACC) to the processor 230 of the vehicle A, and the processor 230 of the vehicle A generate the collective perception message M1 according to the event ACC and related information. Then, the wireless transceiver 250 of the vehicle A broadcast transmits the collective perception message M1 to the devices surrounding the vehicle A.

In some embodiments, devices surrounding vehicle A refer to the devices within a set range from vehicle A. In some other embodiments, the devices surrounding the vehicle A refer to the devices that are within a set range from the vehicle A and no other devices exist between them and the vehicle A. In the scenario of FIG. 1, the device surrounding the vehicle A is the vehicle B. In this situation, the vehicle A transmits the collective perception message M1 to the vehicle B. In the embodiment, the wireless transceiver 250 of the vehicle B receives the collective perception message M1 broadcast transmitted by the vehicle A.

In some embodiments, after the wireless transceiver 250 of the vehicle B receives the collective perception message M1 broadcast transmitted by the vehicle A, the processor 230 of the vehicle B further generates the collective perception message M2 according to the collective perception message M1, and then the wireless transceiver 250 of the vehicle B broadcast transmits the collective perception message M2 to the devices surrounding the vehicle B. In some embodiments, the device surrounding the vehicle B is the vehicle C. the vehicle B transmits the collective perception message M2 to the vehicle C. In the embodiment, the wireless transceiver 250 of the vehicle C receives the collective perception message M2 broadcast transmitted by the vehicle B.

In the embodiments mentioned above, since the information of the perception object (such as event ACC) in the collective perception message M1 is sensed by the vehicle A, the collective perception message M1 generated by the vehicle A is an originating perception message. On the other hand, the collective perception message M2 generated by the vehicle B is not the originating perception message.

In operation S330, it is determined whether to perform a relay transfer of the first collective perception message by a processor of the device of the V2X system. Reference is made to FIG. 2 together, in some embodiments, the operation S330 can be performed by the processor 230 as illustrated in FIG. 2.

Reference is made to FIG. 1 and FIG. 2. For example, after the wireless transceiver 250 of the vehicle B receives the collective perception message M1 broadcast transmitted by the vehicle A, the processor 230 of the vehicle B performs the operations. Similarly, after the wireless transceiver 250 of the vehicle C receives the collective perception message M2 broadcast transmitted by the vehicle B, the processor 230 of the vehicle C performs the determination operation.

In some embodiments, only when the transmitting device and the receiving device are not static devices, the receiving device performs the operation S330. That is to say, if the transmitting device or the receiving device is a static device, the receiving device does not perform the operation S330 but directly relay transfers the received collective perception message. In detail, when the transmitting device is a static device but the receiving device is not a static device, or when the transmitting device is not a static device but the receiving device is a static device, or when both the transmitting device and the receiving device are static devices, the receiving device does not execute the determination operation in operation S330, instead, the receiving device directly relay transfer the received collective perception message.

In some embodiments, the device can be a vehicle, a cellphone or a road side unit (RSU).

In some embodiments, when the collective perception message received by the vehicle (electronic device) is not the originating perception message, the processor of the vehicle (electronic device) performs the determination operation. When the collective perception message received by the vehicle (electronic device) is the originating perception message, the processor of the vehicle (electronic device) does not perform the determination operation, instead, the processor of the vehicle (electronic device) directly relay transfers the received collective perception message.

In terms of the foregoing embodiments, since the collective perception message M1 generated by the vehicle A is the originating perception message, after the vehicle B receives the collective perception message M1, the vehicle B does not perform the determination operation, instead, the vehicle B directly relay transfers the received collective perception message M1. In detail, after the vehicle B receives the collective perception message M1, the vehicle B directly generate collective perception message M2 according to collective perception message M1, the vehicle B further broadcast transfers the collective perception message M2.

On the other hand, since the collective perception message M2 generated by the vehicle B is not the originating perception message, after the vehicle C receives the collective perception message M2, the vehicle C performs the determination operation.

Reference is made to FIG. 4. FIG. 4 is a flow chart illustrating the operation S330 of the message transmission method in FIG. 3 according to some embodiments of the present disclosure. Operation S330 includes the operations S332 and operation S334. The embodiments of the present disclosure are not limited thereto. In some embodiments, in operation S330, the device performs the operations S332 and operation S334 to determine whether to perform the relay transfer of the first collective perception message.

In operation S332, it is determined whether to generate a second collective perception message according to the first collective perception message according to a first angle of the device and a second angle of another device of the first collective perception message. Reference is made to FIG. 2 together, in some embodiments, operation S332 can be performed by the processor 230 in FIG. 2.

In some embodiments, the first angle of the device and the second angle of another device mentioned above are heading angles. In some other embodiments, the first angle of the device and the second angle of another device mentioned above are orientation angles. In some other embodiments, the first angle of the device and the second angle of another device mentioned above are orientation angles or heading angles. In some other embodiments, the first angle of the device and the second angle of another device mentioned above are the direction angles that can be specially defined in the above device and another device respectively.

Figure 5:
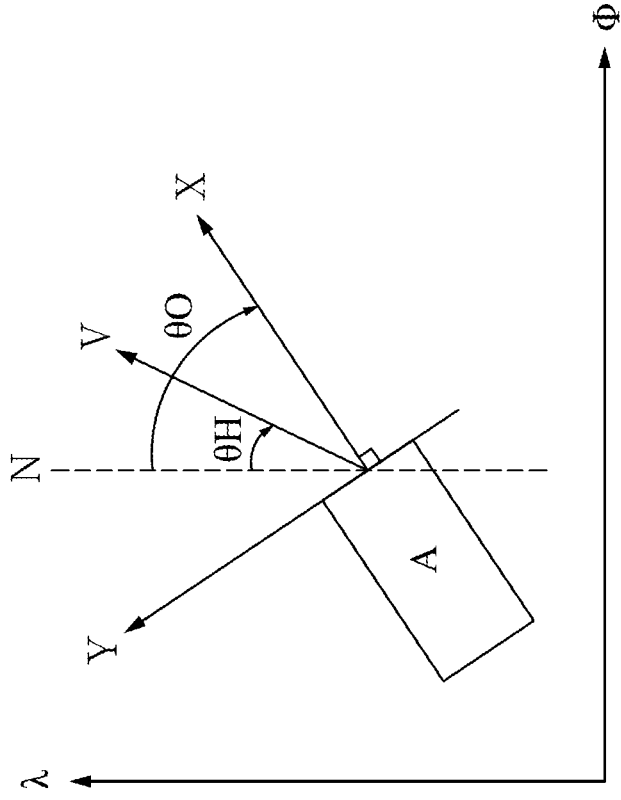
FIG. 5 is a schematic diagram illustrating an angle according to some embodiments of the present disclosure.

Reference is made to FIG. 5. FIG. 5 is a schematic diagram illustrating an angle 500 according to some embodiments of the present disclosure. FIG. 5 takes vehicle A as an example to illustrate, but the angle calculation methods of other vehicles and devices are the same. As illustrated in FIG. 5, the angle $\theta H$ is the heading angle of the vehicle A, and the angle $\theta O$ is the orientation angle of the vehicle A. The orientation angle is the angle sandwiched by the clockwise direction between the true north direction N and the body direction X of the vehicle A. The heading angle is the angle sandwiched by the clockwise direction between true north direction N and the speed direction V of the vehicle A. In detail, the orientation angle is the actual traveling direction of the vehicle A, and the heading angle is only referring to the direction of the velocity component exerted by the vehicle A at the moment of acceleration.

In some embodiments, in operation S332, the processor 230 of the device determines whether the device and another device are moving in the same direction according to the first angle of the device and the second angle of another device, and the processor 230 of the device generates the second collective perception message when the device and another device are moving in the same direction.

In some embodiments, in operation S332, the processor 230 of the device calculates the absolute difference angle between the first angle and the second angle, and the processor 230 of the device generates the second collective perception message when the absolute difference angle is smaller than the threshold value.

In some embodiments, the absolute difference angle between the first angle and the second angle refers to the angle that takes the absolute value after subtracting the second angle from the first angle.

In some embodiments, the threshold value is 120 degrees. However, the embodiments of the present disclosure are not limited thereto.

In some embodiments, when the absolute difference angle is smaller than the threshold value, the processor 230 of the device determines that the device and another device are moving in the same direction. On the contrary, when the absolute difference angle is not smaller than the threshold value, the processor 230 of the device determines that the device and another device are moving in the opposite directions or are not moving in the same direction.

The following will take the heading angle as an example for illustration. For example, in an embodiment, when the vehicle C receives the collective perception message M2 transmitted by the vehicle B, since the collective perception message M2 is not the originating perception message, the vehicle C performs the operation S330 so as to perform the determination operation. The processor 230 of the vehicle C calculates the absolute difference angle between the heading angle of the vehicle C and the heading angle of the vehicle B. When the absolute difference angle between the heading angle of the vehicle C and the heading angle of the vehicle B is smaller than the threshold value, the processor 230 of the vehicle C determines that the vehicle B and the vehicle C are moving in the same direction. In this situation, the processor 230 of the vehicle C generates the collective perception message M3 according to the collective perception message M2.

In another embodiment, assume that the vehicle D receives the collective perception message M3 transmitted by the vehicle C. The collective perception message M3 is generated according to the collective perception message M2, instead of the originating perception message. The vehicle D performs operation S330 so as to perform determination operation. The processor 230 of the vehicle D calculates the absolute difference angle between the heading angle of the vehicle D and the heading angle of the vehicle C. When the absolute difference angle between the heading angle of the vehicle D and the heading angle of the vehicle C is not smaller than the threshold value, the processor 230 of the vehicle D determines that the vehicle C and the vehicle D are not moving in the same direction, or the processor 230 of the vehicle D determines that the vehicle C and the vehicle D are moving in the opposite directions. In this situation, the processor 230 of the vehicle D does not generate another collective perception message according to the collective perception message M3.

Figure 6:
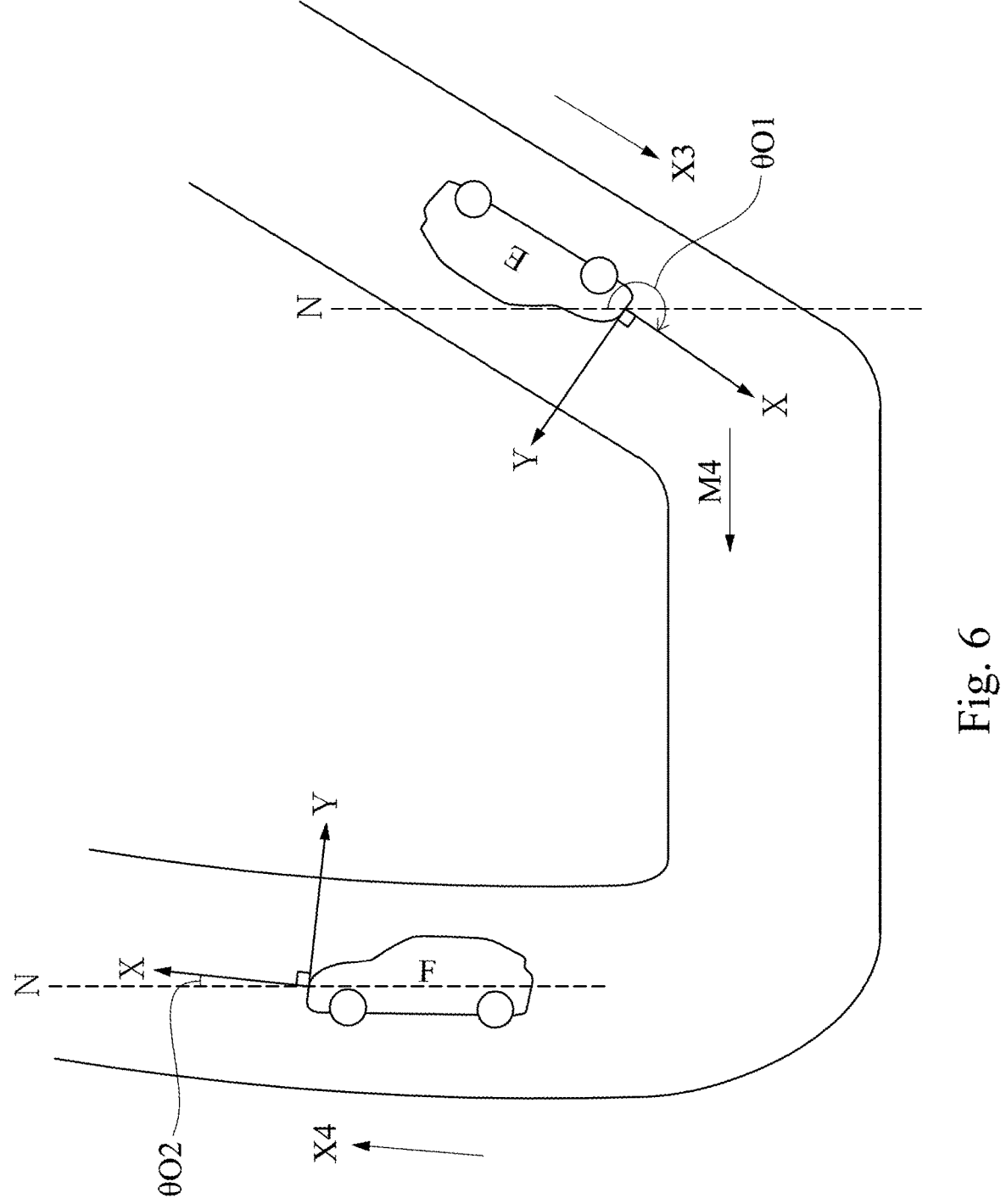
FIG. 6 is a schematic diagram illustrating a scenario of the V2X system according to some embodiments of the present disclosure.

Reference is made to FIG. 6. FIG. 6 is a schematic diagram illustrating a scenario of the V2X system 600 according to some embodiments of the present disclosure. In the scenario as illustrated in FIG. 6, the vehicle E moves along the road of direction X3, and the vehicle F moves along the road of direction X4. As far as the angle of the road is concerned, the vehicle E and the vehicle F are moving in the same direction rather than in opposite directions. In order to cope with such a rough road scenario, in some embodiments, when the road includes turn angles with large angles (e.g. greater than 90 degrees), in operation S332, the processor 230 of the device is further configured to calculate a difference angle between the first angle and the second angle. When the difference angle is smaller than 180 degrees, the processor takes the difference angle as the absolute difference angle, and when the difference angle is not smaller than 180 degrees, the processor subtracts the difference angle from 360 degrees as the absolute difference angle.

In some embodiments, the difference angle refers to the angle that takes the absolute value after subtracting the second angle from the first angle.

For example, in the scenario as illustrated in FIG. 6, the vehicle E transmits the collective perception message M4 to the vehicle F. After the processor 230 of the vehicle F calculates the difference angle between the orientation angle θO2 of the vehicle F and the orientation angle θO1 of the vehicle E, the processor 230 of the vehicle F determines that the difference angle between the orientation angle θO2 of the vehicle F and the orientation angle θO1 of the vehicle E is not smaller than 180 degrees, the processor 230 of the vehicle F further subtracts the calculated difference angle from 360 degrees as the absolute difference angle between the vehicle F and the vehicle E. If the calculated absolute difference angle between vehicle F and vehicle E is less than the threshold value, the processor 230 of the vehicle F determines that the vehicle E and the vehicle F are moving in the same direction. The processor 230 of the vehicle F generates another collective perception message according to collective perception message M4.

In operation S334, the second collective perception message is sent after generating the second collective perception message through a wireless transceiver. Reference is made to FIG. 2 together, in some embodiments, operation S334 can be performed by the processor 230 and the wireless transceiver 250 as illustrated in FIG. 2. Reference is made to FIG. 2 together. After the processor 230 of the vehicle C performs the operation S332, the processor 230 of the vehicle C generates the collective perception message M3 according to collective perception message M2. The processor 230 of the vehicle C further performs operation S334 so as to broadcast the collective perception message M3 to the surrounding vehicle (device) via the wireless transceiver 250 of vehicle C.

In some embodiments, regardless of whether the processor receiving the vehicle (device) determines whether to execute the determination operation or determines to directly generate another collective perception message according to the received collective perception message, the processor receiving the vehicle (device) receives the collective perception message broadcasted by another vehicle (device). In detail, the determination of whether the operation of the relay transfer collective perception message in the embodiments of the present disclosure does not affect the reception of the collective perception message, but only affects the action of relay transfer of the collective perception message.

Reference is made to FIG. 2 again. In some embodiments, the sensor 210 can be a circuit or other elements with environment sensing function. In some embodiments, the processor 230 may be a server, a circuit, a central processor unit (CPU), a microprocessor (MCU) or other functions with temporary storage, calculation, data reading, signals or information receiving, signals or information transmitting, or other device with the same or similar functions. In some embodiments, the wireless transceiver 250 can be an arithmetic circuit or element with data reading, transmission and reception, or similar functions.

The embodiments of the present disclosure provide an electronic device and a message transmission method, according to the absolute difference angle between the transmitting vehicle (device) and the receiving vehicle (device), it is determined whether the transmitting vehicle (device) and the receiving vehicle (device) are moving in the same direction or in the opposite directions (different directions). When the sending vehicle (device) and the receiving vehicle (device) are in the same direction, the receiving vehicle (device) generates and broadcast transmits the collective perception message. On the contrary, when the transmitting vehicle (device) and the receiving vehicle (device) are moving in the opposite directions or not in the same direction, the receiving vehicle (device) neither generate nor broadcast transmit the collective perception message. In this way, the collective perception message can be quickly transmitted to the remote vehicle or device while preventing the infinite flood of information.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electronic device, suitable for a V2X system, wherein the electronic device comprises:

a wireless transceiver, configured to receive a collective perception message from another device of the V2X system, wherein the collective perception message is generated according to a perceived object; and a processor, coupled to the wireless transceiver, configured to perform the following operations:

calculating an absolute difference angle according to a first orientation angle of the electronic device and a second orientation angle of the another device, wherein the another device generates and transmits the collective perception message; and not relaying the collective perception message to a plurality of surrounding devices surrounding the electronic device when the absolute difference angle is greater than or equal to a threshold value;

wherein when a difference angle between the first orientation angle and the second orientation angle is smaller than 180 degrees, the processor takes the difference angle as the absolute difference angle, and when the difference angle is not smaller than 180 degrees, the processor subtracts the difference angle from 360 degrees as the absolute difference angle.

2. The electronic device of claim 1, wherein the processor is further configured to determine whether the electronic device and the another device are moving in a same direction according to the absolute difference angle, wherein when the processor determines that the electronic device and the another device are not moving in the same direction, the processor does not relay the collective perception message to the plurality of surrounding devices surrounding the electronic device.

3. An electronic device, suitable for a V2X system, wherein the electronic device comprises:

a wireless transceiver, configured to receive a collective perception message from another device of the V2X system, wherein the collective perception message is generated according to a perceived object; and a processor, coupled to the wireless transceiver, configured to perform the following operations:

calculating an absolute difference angle according to a first heading angle of the electronic device and a second heading angle of the another device, wherein the another device generates and transmits the collective perception message; and not relaying the collective perception message to a plurality of surrounding devices surrounding the electronic device when the absolute difference angle is greater than or equal to a threshold value;

wherein when a difference angle between the first heading angle and the second heading angle is smaller than 180 degrees, the processor takes the difference angle as the absolute difference angle, and when the difference angle is not smaller than 180 degrees, the processor subtracts the difference angle from 360 degrees as the absolute difference angle.

* * * * *